United States Patent Office
2,727,068
Patented Dec. 13, 1955

2,727,068

VINYLOXYALKYL-CYANAMIDES

Peter L. de Benneville, Philadelphia, Pa., assignor to Rohm & Haas Company, Philadelphia, Pa., a corporation of Delaware No Drawing. Application April 10, 1953,
Serial No. 348,110

12 Claims. (Cl. 260—551)

This invention deals with cyanamides of the formula

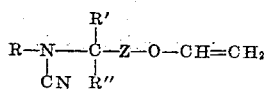

wherein R is hydrogen or a hydrocarbon group including alkyl, alkenyl, aryl, aralkyl, or cycloalkyl and R' and R" represent hydrogen or alkyl groups, with the limitation that at least one of the groups R, R', and R" is a hydrocarbon group, and Z is an alkylene group of one to seven carbon atoms. This invention also relates to processes for preparing these compounds.

One method of preparing them comprises reacting an aminoalkyl vinyl ether, $RNHC(R')(R'')ZOCH=CH_2$, and a cyanogen halide, CNX, where X is chlorine or bromine. This reaction may be carried out in the presence of an inorganic alkaline reagent to combine with the hydrogen halide split out. Sodium bicarbonate, sodium carbonate, potassium carbonate, sodium or potassium hydroxide, lime, and the like are suitable for this purpose. The reaction is best accomplished in the presence of an inert organic solvent such as a halogenated hydrocarbon, naphtha, benzene, toluene, and the like. In some instances water can be used, alone or in conjunction with an organic solvent. Temperatures between 0° and 75° C. may be used. The product is usually distillable at reduced pressure and may be purified in this way.

As an alternative method for preparing these compounds, there may be used as a starting material a tertiary aminoalkyl vinyl ether of the formula

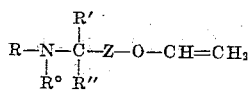

where R is a hydrocarbon group including alkyl, alkenyl, cycloalkyl, aryl, and aralkyl, R⁰ is likewise a hydrocarbon group, particularly lower alkyl or aralkyl, R' is hydrogen or alkyl, R" is hydrogen or alkyl, and Z is an alkylene group. A compound of this formula is reacted by addition between 0° and 75° C. or more with cyanogen chloride or cyanogen bromide, apparently to form a quaternary compound, which on heating to 50° to 125° C. decomposes to give the cyanamide

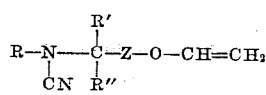

and an alkyl or aralkyl halide, formed from the halogen of the cyanogen halide and the smaller or more reactive of the groups R and R⁰.

Aminoalkyl vinyl ethers of various types and sizes are known and methods for their preparation given in the art are widely applicable. Amino-alcohols react with acetylene in the presence of alkaline catalysts to give ethers. For example, this reaction is carried out with a small amount (5–10%) of potassium hydroxide by passing acetylene into an alcohol,

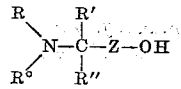

usually in an inert organic solvent, such as benzene, toluene, or a high boiling ether, at 120°–150° C. under pressures of 300 to 500 pounds per square inch.

By this reaction there result ethers of the structure

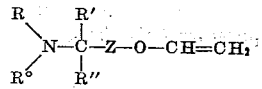

In these formulas R is, as previously shown, a hydrocarbon group or hydrogen, R⁰ is a hydrocarbon group, particularly lower alkyl or aralkyl, R' and R" are hydrogen or alkyl, and Z is primarily an alkylene group. Of these ethers those having a chain of two carbon atoms between oxygen and nitrogen, without regard to R' and R", are of most interest. Such a two carbon chain may carry groups of considerable size as in $$—CH_2CH(C_6H_{13})— \text{ or } —CH_2CH(C_{12}H_{25})—$$

Also the chain between oxygen and nitrogen may carry other than alkyl groups, the phenyl group being a readily available substituent. The chain,

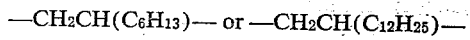

may also be part of a cycle as in $H_2NC_6H_{10}OCH=CH_2$ or $$H_2NC(CH_3)_2.C_6H_{10}.CH_2CH_2OCH=CH_2$$

the $C_6H_{10}$ group being the cyclohexyl nucleus. Also, this chain may be interrupted with heteroatoms, as in the $—CH_2CH_2OCH_2CH_2—$ or $—CH_2CH_2SCH_2CH_2—$ groups which are readily available.

Typical groups for R or R⁰ when they are not hydrogen include alkyl, alkenyl, cycloalkyl, aralkyl, and aryl groups, such as methyl, ethyl, propyl, butyl, hexyl, octyl, nonyl, decyl, dodecyl, allyl, methallyl, undecenyl, cyclopentyl, cyclohexyl, benzyl, methylbenzyl, butylbenzyl, phenylethyl, phenyl, methylphenyl, butylphenyl, octylphenyl, nonylphenyl, etc. Usually an N-substituent will contain not over 18 carbon atoms. When both R and R⁰ are hydrocarbon groups, it is preferred that one of them contain not over twelve carbon atoms and it is necessary that the other be small enough or reactive enough to be displaced, for instance, as an alkyl or aralkyl halide, such as methyl, ethyl, butyl, or benzyl.

Typical aminoalkyl vinyl ethers useful as starting materials include the following:

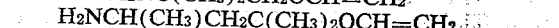
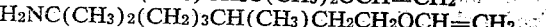
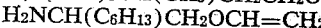
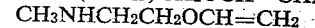
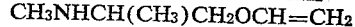
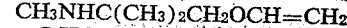
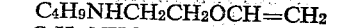
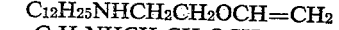
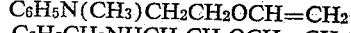
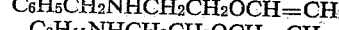
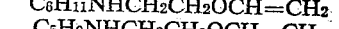
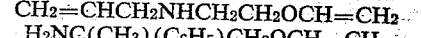
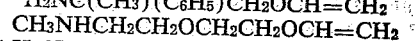
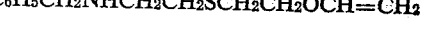

$(CH_3)_2NCH_2CH_2OCH=CH_2$
$C_4H_9(CH_3)NCH_2CH_2OCH=CH_2$
$C_9H_{19}(CH_3)NCH_2CH_2OCH=CH_2$
$C_{12}H_{25}(CH_3)NCH_2CH_2OCH=CH_2$
$C_8H_{17}(C_6H_5CH_2)NCH_2CH_2OCH=CH_2$ etc.

The reaction of aminoalkyl vinyl ether and cyanogen halide is illustrated by the following examples in which parts are by weight:

*Example 1*

In a reaction vessel surrounded by an ice bath there were mixed 40.4 parts of N-methylaminoethyl vinyl ether, 27.6 parts of anhydrous potassium carbonate, 135 parts of benzene, and 20 parts of water. Into this stirred mixture at a low temperature (0°–10° C.), 24.6 parts of cyanogen chloride were passed over a 30 minute period. The mixture was then allowed to warm up to about 25° C. and was stirred for an hour at about this temperature. Sodium chloride in an amount of about 10 parts was added to reduce the solubility of the cyanamide which had been formed. The aqueous and benzene layers were separated. The benzene layer was freed of benzene by heating and the residue was fractionally distilled. At 137°–139° C./32 mm. a fraction of 39 parts was obtained. It corresponded in composition to N-methyl-N-vinyloxyethylcyanamide, $$CH_3-N-CH_2CH_2-O-CH=CH_2$$
$$\vert$$
$$CN$$

having a density at 25° C. of 0.9835, a refractive index, $N_D^{25}$ of 1.4546, a value for molecular refraction of 34.7 (theory 34.6), and a nitrogen content of 21.9% (theory 22.2%).

Repetition of the above process with substitution of cyanogen bromide for the chloride leads to the identical product.

*Example 2*

To a reaction vessel equipped with stirrer and a condenser chilled with ice water there was added 11.5 parts of β-dimethylaminoethyl vinyl ether. Cyanogen chloride as a gas was passed in over a 15 minute period in an amount of 6.4 parts. Heat was evolved and the temperature of the reaction mixture was controlled by application of ice and water to the reaction vessel. When the exothermic reaction had subsided, the reaction mixture was heated on a steam bath for an hour. It was cooled to about 30° C. and extracted with ether. The ether extract was filtered and distilled to yield four parts of N-methyl-N-vinyloxyethylcyanamide. This product was distilled at 120°–140° C./26 mm.

*Example 3*

To a mixture of 104 parts of 2-methyl-2-aminopropyl vinyl ether, 280 parts of benzene, 49 parts of water, and 65 parts of anhydrous potassium carbonate there was added over a one hour period 57.5 parts of cyanogen chloride at 10°–20° C. The mixture was stirred for two hours at 25°–30° C. The benzene layer was taken and distilled. At 104°–107° C./1.5 mm. there was obtained a clear, light-yellow oil. It contained by analysis 19.6% of nitrogen and corresponded in composition to N-α,α-dimethyl-β-vinyloxyethylcyanamide, $$\begin{array}{c}CH_3\\|\\NC.NHCCH_2OCH=CH_2\\|\\CH_3\end{array}$$

*Example 4*

To a solution of 46 parts of 1-methylamino-2-vinyloxypropane, 40 parts of toluene, 30 parts of potassium carbonate, and 50 parts of water there was slowly added a solution of 24 parts of cyanogen chloride in 86 parts of toluene. The temperature of the reacting mixture was held at 5°–8° C. with the aid of an ice bath. The mixture was stirred for two hours with the temperature rising to 25° C. Layers were then allowed to form. The organic layer was taken and distilled. After removal of toluene a fraction of 50 parts was obtained distilling at 86°–93° C./0.8 mm. It contained by analysis 19.8% of nitrogen. This product is N-methyl-N-2-vinyloxypropylcyanamide, for which the theoretical nitrogen content is 20.0%. This compound has the formula $$CH_3N(CN)CH_2CH(CH_3)OCH=CH_2$$

*Example 5*

In the same way there were reacted in toluene solution 85 parts of β-3,5,5-trimethylhexylaminoethyl vinyl ether and 25 parts of cyanogen chloride. There was obtained at 128°–132° C./0.5 mm. a fraction of 70 parts which corresponded in composition to N-3,5,5-trimethylhexyl-N-vinyloxyethylcyanamide. The product as obtained contained 11.7% of nitrogen by analysis (theory 11.8%).

*Example 6*

In the same way there were reacted 83.5 parts of β-2-ethylhexylaminoethyl vinyl ether and 25 parts of cyanogen chloride. Upon distillation there was obtained a fraction amounting to 90 parts distilling at 111–114° C./0.3 mm. It corresponded in composition to N-2-ethylhexyl-N-vinyloxyethylcyanamide.

*Example 7*

The above procedure was followed with 68 parts of N-cyclohexyl-β-aminoethyl vinyl ether and 24 parts of cyanogen chloride. At 103–105° C./0.3 mm. there was distilled a fraction of 57.5 parts which was N-cyclohexyl-N-vinyloxyethylcyanamide.

The procedure used in Examples 4 to 7 was applied to N-tert.-butylaminoethyl vinyl ether to yield N-tert.-butyl-N-vinyloxyethylcyanamide, distilling at 103°–108° C./2 mm. and having $N_D^{25}$ of 1.4556. It was also followed with N-tert.-octylaminoethyl vinyl ether to form N-tert.-octyl-N-vinyloxyethylcyanamide, distilling at 120°–125° C./0.6 mm. and having a refractive index of 1.4672 at 25° C. In the same way N-allylamino-2-propyl vinyl ether yields the cyanamide, distilling at 95–100° C./1–2 mm., $$CH_2=CHCH_2-N-CH_2CH_2-O-CH=CH_2$$
$$\vert$$
$$CN$$

The subgroups of compounds of the formulae $$RN(CN)C(CH_3)_2-Z-O-CH=CH_2$$

and $$RN(CN)CH_2CH_2-O-CH=CH_2$$

are of considerable interest, particularly when R is attached to nitrogen at a carbon atom carrying hydrogen.

*Example 8*

A solution was prepared from 57.5 parts of 2-aminobutyl vinyl ether in 60 parts of toluene. This was mixed with 35 parts of potassium carbonate and 60 parts of water. The mixture was chilled in an ice bath and slowly treated with 31 parts of cyanogen chloride, the temperature of the mixture being kept below 10° C. The reaction mixture was then stirred for two hours at 10° to 30° C. and allowed to stand overnight. The layers which formed were separated. The organic layer was heated on a steam bath under reduced pressure to remove solvent. It was then heated to 100° C./1 mm. to strip the residual oil. This material gave the correct analysis for N-vinyloxybutylcyanamide, $$\begin{array}{c}HN-CHCH_2OCH=CH_2\\|\quad\;\;|\\CN\;\;C_2H_5\end{array}$$

having a refractive index of 1.4920. The yield is 91%.

*Example 9*

The procedure of Example 8 was followed, starting with 7-amino-3,7-dimethyloctyl vinyl ether. The residue was not distillable, but corresponded in composition to that of the cyanamide, $$\begin{array}{c}CH_3\\|\\HN-C-(CH_2)_3CHCH_2CH_2OCH=CH_2\\|\quad\;\;|\qquad\qquad|\\CN\;\;CH_3\qquad\quad CH_3\end{array}$$

This has a refractive index at 25° C. of 1.4726.

Another subgroup of interest is that of the formula $$R-N(CN)-C(CH_3)(CH_3)-Z-O-CH=CH_2$$

where R is hydrogen or hydrocarbon. Z is an alkylene group up to seven carbon atoms, and most commonly is methylene.

In the same way cyanamides can be prepared from 3-amino-1,3-dimethylbutyl vinyl ether to give 1,1-dimethyl-3-vinyloxybutylcyanamide and from 4-amino-4-methylpentyl vinyl either to give 1,1-dimethyl-4-vinyloxybutylcyanamide. From N-octadecylaminoethyl vinyl ether there is prepared the corresponding N-octadecyl-N-vinyloxyethylcyanamide, which is collected as a stripped residue. From N-benzylaminoethyl vinyl ether there is prepared N-benzyl-N-vinyloxyethylcyanamide while the N-phenyl-analogue gives the N-phenyl-N-vinyloxyethylcyanamide.

Cyanamides described above have fungicidal value. A one per cent solution of N-methyl-N-vinyloxyethylcyanamide, for instance, was found to inhibit completely the germination of spores of *Macrosporium sarcinaeforme* and *Sclerotinia fructicola*. Fungicidal activity increases as the size of the molecule increases to about 260 and then decreases. The cyanamides in the smaller range of molecular weight exhibit insecticidal activity. For example, N-methyl-N-vinyloxyethylcyanamide at 1:400 in a spray gave a kill of milkweed bug of 49%.

The cyanamides of this invention are polymerizable under the influence of boron fluoride catalysts such as the ethyl etherate. The polymers of the first members of the series are insoluble in non-polar organic solvents, while those with long alkylene chains or N-substituents of eight to eighteen carbon atoms or more become hydrocarbon-soluble. The polymers are generally tacky gums with marked adhesive properties.

The cyanamides with N-substituents having hydrogen on the carbon atom attached to nitrogen or with substituents on the carbon atom alpha to nitrogen are particularly useful as chemical intermediates, reacting with dicyandiamide to form melamine derivatives of a new type.

I claim:

1. A compound of the formula $$R-N(CN)-C(R')(R'')-Z-O-CH=CH_2$$

wherein R is a member of the class consisting of hydrogen and hydrocarbon groups of not over 18 carbon atoms, R' and R'' are members of the class consisting of hydrogen and alkyl groups, with the proviso that at least one of the groups R, R' and R'' is hydrocarbon, and Z is an alkylene group of one to seven carbon atoms.

2. A compound of the formula $$R-N(CN)-C(CH_3)(CH_3)-Z-O-CH=CH_2$$

where R is a hydrocarbon group of not over 12 carbon atoms and Z is an alkylene group of not over seven carbon atoms.

3. A compound of the formula $$R-N(CN)-CH_2CH_2-O-CH=CH_2$$

where R is a hydrocarbon group of not over 12 carbon atoms.

4. A compound of the formula $$CH_3-N(CN)-CH_2CH_2-O-CH=CH_2$$

5. A compound of the formula $$C_6H_{11}-N(CN)-CH_2CH_2-O-CH=CH_2$$

wherein C₆H₁₁ is a cyclohexyl group.

6. A compound of the formula $$CH_2=CHCH_2-N(CN)-CH_2CH_2-O-CH=CH_2$$

7. A compound of the formula $$NC.NH-C(CH_3)(CH_3)-CH_2-O-CH=CH_2$$

8. A compound of the formula $$CH_3-C(CH_3)(CH_3)-CH_2-C(CH_3)(CH_3)-N(CN)-CH_2CH_2OCH=CH_2$$

9. A process for preparing compounds of the structure $$R-N(CN)-C(R')(R'')-Z-O-CH=CH_2$$

which comprises reacting together a cyanogen halide, CNX, wherein X is a member of the class consisting of chlorine and bromine, and a compound of the formula $$RNH-C(R')(R'')-Z-O-CH=CH_2$$

in the presence of an alkaline reagent for reacting with a hydrogen halide, R representing a member of the class consisting of hydrogen and hydrocarbon groups of not over 18 carbon atoms, R' and R'' being members of the class consisting of hydrogen and alkyl groups, with the proviso that at least one of the groups R, R', and R'' is hydrocarbon, and Z is an alkylene group of one to seven carbon atoms.

10. A process for preparing compounds of the formula $$R-N(CN)-CH_2CH_2-O-CH=CH_2$$

which comprises reacting together in the presence of an alkaline reagent for taking up hydrogen halide cyanogen chloride and a compound of the formula $$RNHCH_2CH_2-O-CH=CH_2$$

where R is a hydrocarbon group of not over 12 carbon atoms.

11. A process for preparing compounds of the formula $$R-N(CN)-C(CH_3)(CH_3)-Z-O-CH=CH_2$$

which comprises reacting together in the presence of an alkaline reagent for taking up hydrogen halide cyanogen chloride and a compound of the formula $$RNH-C(CH_3)(CH_3)-Z-O-CH=CH_2$$

where R is a hydrocarbon group of not over 12 carbon atoms and Z is an alkylene group of not over seven carbon atoms.

12. A process for preparing compounds of the formula $$H-N(CN)-C(CH_3)(CH_3)-Z-O-CH=CH_2$$

which comprises reacting together in the presence of an alkaline reagent for taking up hydrogen halide cyanogen halide and a compound of the formula $$H_2N-C(CH_3)(CH_3)-Z-O-CH=CH_2$$

where Z is an alkylene group of not over seven carbon atoms.

No references cited.